Dec. 17, 1963  F. W. HOLST  3,114,274
SAW SHARPENING DEVICE
Filed Oct. 31, 1960  3 Sheets-Sheet 1

INVENTOR.
FRED W. HOLST
BY FULWIDER, MATTINGLY
& HUNTLEY
ATTORNEYS

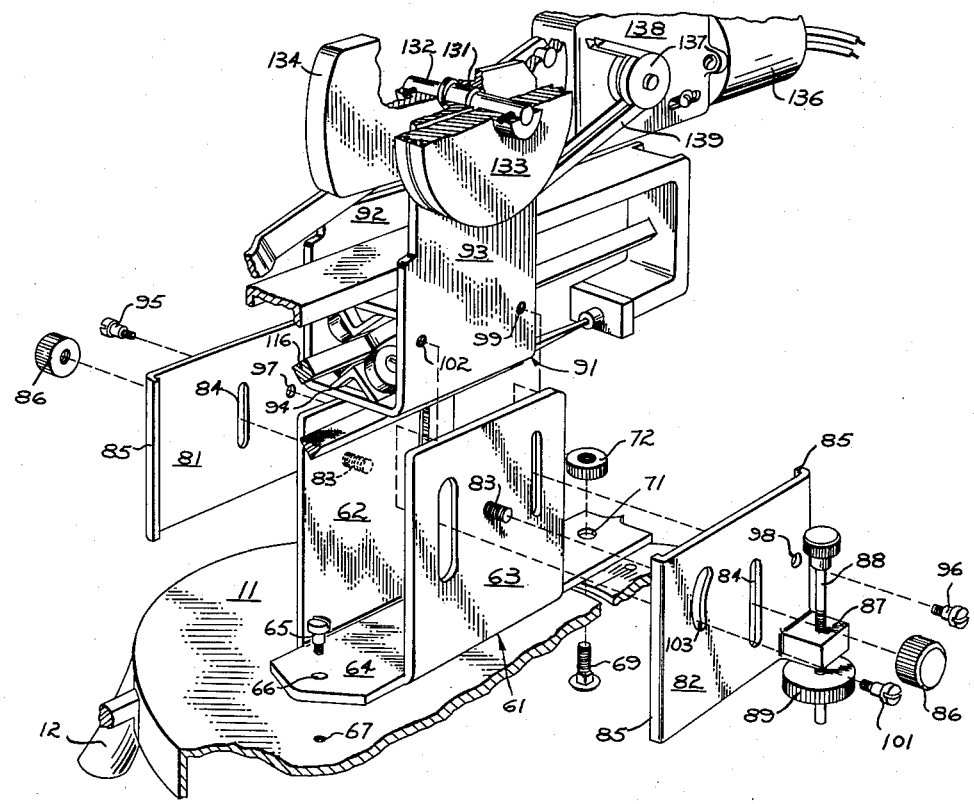

Dec. 17, 1963 F. W. HOLST 3,114,274
SAW SHARPENING DEVICE
Filed Oct. 31, 1960 3 Sheets-Sheet 3

INVENTOR.
FRED W. HOLST
BY FULWIDER, MATTINGLY
& HUNTLEY
ATTORNEYS

United States Patent Office 3,114,274
Patented Dec. 17, 1963

3,114,274
SAW SHARPENING DEVICE
Fred W. Holst, 3111 Cricklewood St., Torrance, Calif.
Filed Oct. 31, 1960, Ser. No. 65,997
8 Claims. (Cl. 76—35)

This invention relates generally to apparatus for sharpening the teeth of longitudinal and circular saws.

More particularly, the invention relates to devices for supporting saws and cutting tools for sharpening the saw teeth in which various adjustments and settings may be made to facilitate the cutting operations which sharpen the saw teeth and which insure that the sharpened teeth will be substantially uniform. In such saw sharpening operations it is desired that the angle and depth of the sharpening cut shall be controlled and be uniform with respect to the individual teeth of the saw. It is further desired that such sharpening cuts shall be made with proper spacing along the saw edge to develop the proper spacing between the saw teeth.

Having the above in view, it is therefore an object of the invention to provide an improved device facilitating the sharpening of saw teeth.

Another object of the invention is the provision of a saw sharpening device having improved means for mounting and adjusting a cutting tool relative to the saw teeth.

A further object of the invention is the provision of a saw sharpening device having improved means for determining and pre-setting the angle and depth of cut of a saw tooth sharpening tool.

A still further object of the invention is the provision of a saw sharpening device having improved adjustment and pre-setting means for determining and limiting the angle and depth of a cut of a saw tooth cutting tool and the spacing along the saw between successive cutting operations made on successive saw teeth.

Yet another object of the invention is the provision of a saw sharpening device having improved means for adjusting and pre-setting the cutting operations of a power driven sharpening tool for saw teeth.

These and other objects of the invention will be apparent to those skilled in the art from the following description of a presently preferred form of the invention and the annexed drawings thereof, in which:

FIGURE 2 is an exploded perspective view, more particularly showing the supporting and pre-setting means for the saw tooth sharpening tool;

FIGURE 3 is an enlarged detail view of the saw advancing ratchet means taken generally at the plane 3—3 of FIGURE 1;

FIGURE 4 is a sectional view taken on the line 4—4 of FIGURE 3;

Figure 1:
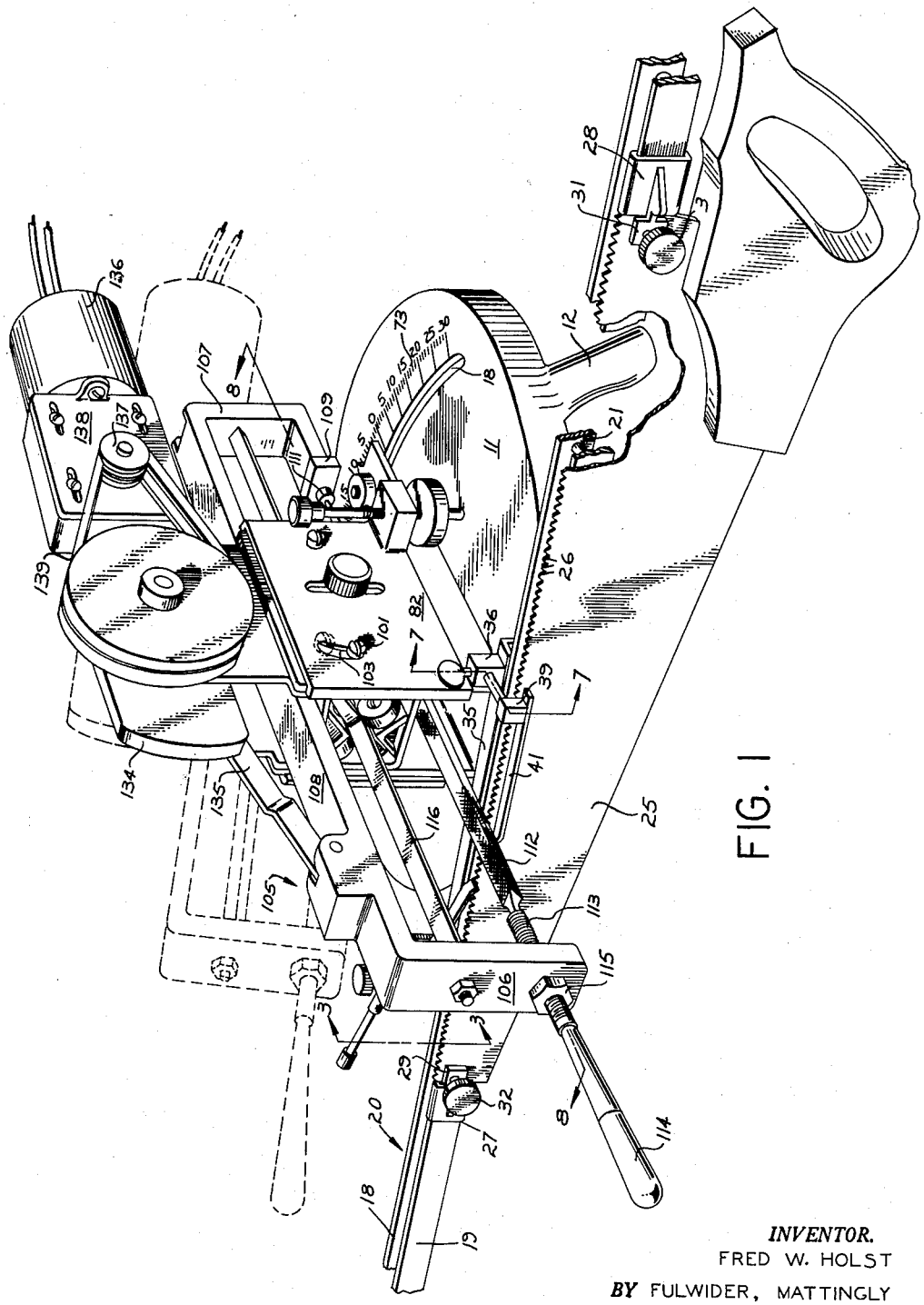
FIGURE 1 is a perspective view of a saw sharpening device according to the present invention.

In the form of the invention selected to be specifically illustrated in the drawings, the saw sharpening device of the present invention is shown in connection with the sharpening of the teeth of a hand saw, as more particularly shown in FIGURE 1. It will, of course, be readily understood that other longitudinal saws and circular saws may, with little or no modification, be sharpened within the device of the present invention. Also, while the specifically illustrated apparatus employs, as its cutting tool for sharpening the saw teeth, a reciprocating file, it will be readily apparent that other forms of cutting tools are equally susceptible for use in the apparatus of the present invention. One example of such a tool, whose substitution will be obvious to those skilled in the art, is a rotary grinding wheel which may be supported and adjusted in its cutting operatons by the apparatus of the invention.

The presently preferred embodiment of the invention selected for illustration in the drawing includes a base plate 11 which may be rigidly mounted on a supporting frame or bench or may be provided with its own support, for example, on the legs 12. To support a saw in sharpening position thereon, the base plate 11 is provided with a pair of forwardly extending L-shaped arms 13 having their horizontal legs secured to the under surface of the base plate 11 as by welding, brazing or being bolted thereto. Upon the front faces of the vertical legs of the arms 13 is secured, as by brazing or welding, a horizontal bar 14 carrying a pair of horizontally spaced bearing grips 15, having upper and lower U-shaped bearing supports 16 and 17. The saw supporting carriage is made up of a pair of elongated metal strips 18 and 19 connected together in spaced relation by means of a plurality of spaced pins 21, brazed or otherwise connected thereto. The strip 18 of the saw carriage is received within the horizontally spaced pair of opposed U-shaped bearing supports 16 and 17 so that the saw supporting carriage is mounted for transverse rectilinear movement in front of the base plate 11. The carriage is readily removable from the base plate when the strip 18 is moved a sufficient distance toward one side or the other to disengage it from the bearing grips 15 and the U-shaped bearing supports 16 and 17 thereof.

The hand saw selected for illustration in the drawing is shown at 25 as having the usual saw teeth 26 and is clamped on the front face of the metal strip 19 of the saw supporting carriage 20 by means of clamps 27 and 28 slidably mounted on the strip 19 and having their inner edges engaging the opposite ends of the saw 25. The clamps 27 and 28 have inwardly projecting fingers 29 and 31 in which are threaded locking screws 32 and 33, respectively, whose ends are engaged with the front face of the saw adjacent its opposite ends to clamp it in position on the carriage 20.

Figure 7:
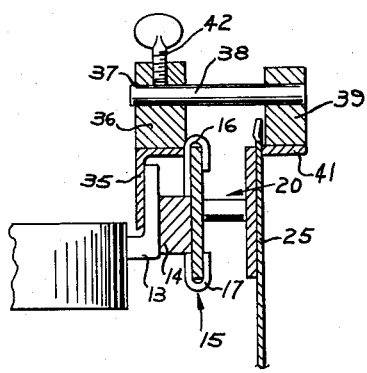
FIGURE 7 is a detail sectional view taken on the line 7—7 of FIGURE 1.
Figure 8:
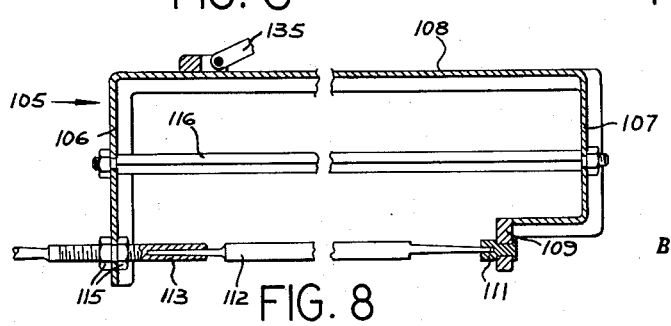
FIGURE 8 is a longitudinal sectional view, on a reduced scale, through the cutting tool supporting carriage.

An elongated L-shaped bracket 35 is mounted on the arms 13 supported by the base plate 11 and adjacent one end thereof carries a guide block 36, brazed or otherwise mounted thereon (FIG. 7). The guide block 36 has a transverse bore 37 therethrough, through which extends a pin 38 rigidly mounted in a block 39 upon which is supported an elongated finger 41. The finger 41 bears against the front face of the saw adjacent the sharpening position so as to hold it against the face of the metal strip 19 thereat. The pin 38 is held in its adjusted position within the bore 37 by means of a set screw 42.

At the opposite end of the L-shaped bracket 35 is mounted an upstanding Z-shaped support 45 (FIGS. 3 and 4) which supports a tubular bearing 46, brazed or otherwise supported thereon, in which is pivotally mounted a shaft 47 rigidly connected at its opposite ends to arms 48 and 49. Upon the end of the arm 48 is pivoted a ratchet arm 51, biased downwardly relative thereto into engagement with the teeth 26 by means of a spring 52. The upper horizontal shelf 53 of the Z-shaped support 45 has threaded therein a pair of adjusting screws 54 and 55 located at opposite sides of the pivoted shaft 47, as shown more particularly in FIG. 3. The adjusting screws 54 and 55 are provided with locking collars 56 and 57, respectively. It will be seen that the adjusting screw 54 limits rotational movement of the arm 49 in a clockwise direction and that the adjusting screw 55 limits rotation of the arm 49 in a counterclockwise direction.

When the arm 49 is moved from its full line position in FIG. 2 into the dotted line position, the ratchet arm 51 will move toward the left a distance determined by the position of the adjustment screw 54 and will slip over one or more of the teeth 26, as determined by the adjusted position of the screw. When the arm 49 is thereafter returned from its dotted line to its full line position, it will advance the saw 25 and the carriage 20 toward the right, as viewed in FIG. 2, to a position determined by the adjusted position of the screw 55. By adjustment of the screw 54 the operator can pre-determine whether successive cutting operations will be performed on immediately adjacent saw teeth or upon saw teeth spaced further apart, in accordance with the configuration of the particular saw being sharpened. The adjustment of the screw 55 insures that the saw tooth being sharpened is properly indexed with respect to the cutting tool for each cutting operation.

The structure heretofore described relates to the mounting of the saw upon which the sharpening operation is to be performed and its movement transversely of the base plate to locate successive saw teeth in properly indexed position with respect to the cutting tool. There will now be described the mounting and adjusting means for the sharpening tool which performs the cutting operations on the saw teeth.

Upon the top face of the base plate 11 is mounted a U-shaped support 61 having opposite legs 62, 63 and a bight 64. The front end of the bight 64 is pivoted on a pin 65 passing through a clearance opening 66 therein and threaded into an opening 67 in the top face of the base plate 11 (FIG. 2). An arcuate slot 68 extends through the base plate 11 with the opening 67 as a center, and a stud 69 extends through the slot 68 and through an opening 71 in the back end of the bight 64 of support 61. A thumb nut 72 is threaded on the stud 69 to tighten the support 61 against the base plate 11 in adjusted position. The top of the base plate 11 is provided with suitable angular indicia 73 along the slot 68 to indicate the adjusted position of the support 61 upon the base plate.

A pair of vertically adjustable supporting plates 81 and 82 are mounted upon the outer faces of the opposite legs 62 and 63 of the support 61, as by means of studs 83 mounted upon the legs and extending through elongated vertical slots 84 in the plates 81 and 82. End flanges 85 on the plates 81 and 82 engage the opposite edges of the legs 62 and 63 to prevent rotation of the plates 81 and 82, and they are held in their vertically adjusted position relative to the base plate 11 by means of thumb nuts 86 threaded on the studs 83. To move the plates 81 and 82 into their adjusted positions, the plate 82 is provided with an integral side lug 87 in which is threaded an adjusting screw 88 provided with a locking collar 89, the bottom of the adjusting screw 88 bearing upon the top face of the base plate 11.

Within the U-shaped support 61 is mounted a second U-shaped support 91 having opposite legs 92, 93 and a bight 94. A pair of pivot pins 95 and 96 (FIG. 2) pass freely through openings 97 and 98, respectively, in the plates 81 and 82 and are threaded into openings 99 in the opposite legs 92 and 93 of the support 91. The support 91 is thereby mounted upon the adjustable plates 81 and 82 for swinging or rotative movement about the horizontal axis aligned with the pivot pins 95 and 96. A stop pin 101 is threaded into the opening 102 in the leg 93 and moves within an arcuate slot 103 in the plate 82 to limit the movement of the support 91 in a counterclockwise direction, as viewed in FIGS. 1 and 2, and thereby limit the depth of the sharpening cut of the tool, as will appear more fully hereinafter.

Figure 5:
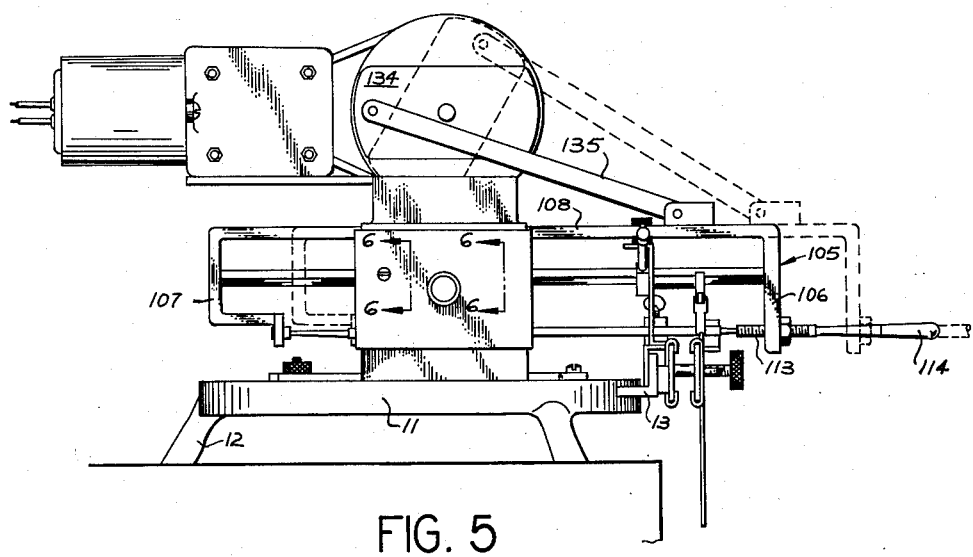
FIGURE 5 is a side elevational view of the saw sharpening device of the present invention.
Figure 6:
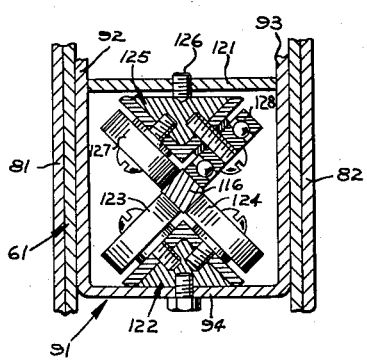
FIGURE 6 is a sectional view taken at each of the planes 6—6 and 6—6 of FIGURE 5 showing one of the spaced supports for the carriage carrying the sharpening tool.

The supporting carriage for the sharpening tool is shown at 105 as being of generally inverted U-shape with a front leg 106, a rear leg 107 and a top bight 108. The rear leg 107 has an inwardly directed portion carrying a depending arm 109 in which is located a socket 111. The socket 111 supports the rear end of the cutting tool, here specifically illustrated as a V-shaped file 112, which has its forward end supported within a socket 113 integral with a handle 114 adjustably supported on the leg 106 by opposed lock nuts 115. The carriage 105 is supported upon a rod 116 extending between the legs 106 and 107 and rectangular in cross-section, as shown in FIGURE 6. The rod 116 is supported by spaced sets of bearing wheels which are located at the two planes 6—6 and 6—6 in FIG. 5, one set only being shown in FIGURE 6.

Between the legs 92 and 93 of the support 91 is mounted a transverse plate 121 (FIG. 6) in spaced relation to the bight 94 so as to form a substantially rectangular compartment within the support 91. Along the bight 94 are mounted spaced supports 122 having upper surfaces extending at 45° angles to the horizontal and vertical, in which are mounted supporting wheels 123 and 124. A similar pair of spaced supports 125, held in position by set screws 126 in the plate 121, carry wheels 127 and 128. Between the wheels 123, 124, and 127, 128 is disposed the rectangular rod 116 upon which the carriage 105 is carried for reciprocatory movement.

The upper end of the leg 93 of the support 91 is provided with a bearing 131 in which is rotatably mounted a shaft 132 having a a pulley 133 rigidly mounted thereon at one end and a crank 134 at the opposite end. A crank arm 135 interconnects the crank 134 and the bight 108 of the carriage 105 to effect reciprocating movement of the carriage 105 as the crank 134 rotates. The leg 93 of the support 91 also supports driving means for the pulley 133, exemplified by an electric motor 136 driving a pulley 137 through a suitable reduction gear box 138. Suitable drive belts 139 interconnect the pulleys 133 and 137.

The operation of the illustrated embodiment of the present invention will be described with reference to the setting up and adjustment of the various elements of the apparatus, with a view toward effecting a saw tooth sharpening operation. The sequence of operations need not follow that given here only by way of convenience of description. Initially, a properly sized cutting file 112 may be selected in accordance with the size of the teeth 26 of the particular saw 25 to be sharpened and mounted on the carriage 105 between the sockets 111 and 113. Thereafter, the saw 25 is mounted on the carriage 20 against the front face of the metal strip 19 between the clamps 27 and 28 through tightening of the clamping screws 32 and 33. It is positioned with the teeth 26 of the saw extending above the upper edge of the strip 19, as shown in FIGS. 1, 4 and 7. Thereafter, the finger 41 is moved into engagement with the front face of the saw and the set screw 42 tightened to retain the pin 38 with the finger 41 holding the saw rigidly against the face of the metal strip 19 in the sharpening zone.

Preferably at this time the angle of cut is adjusted by loosening the thumb nut 72 and rotating the support 61 across the face of the base plate 11 about the vertical pivot 65 to the angular position with respect to the plane of the saw 25 at which it is desired that the sharpening cut be made. With this angular relationship so pre-set the thumb nut 72 is tightened to hold the support 61 in its adjusted position. Thereafter, the thumb nuts 86 may be loosened so that the supporting plates 81 and 82 may be adjusted vertically. This latter adjustment is effected by rotation of the adjusting screw 88 against the top face of the base plate 11 which moves the plates 81 and 82 upwardly or downwardly, as the case may be, until the maximum downward position of the carriage 105 permitted by the stop stud 101 and slot 103 places the downwardly directed apex of the V-shaped file 112 at the desired depth of sharpening cut. With the vertical positions of the side plates 81 and 82 so adjusted, the thumb nuts 86 are tightened, it being understood that in the rotation of the adjusting screw 88, the collar 89 is loosened and then again tightened to lock the adjusting screw against further movement. Thus the supporting plates 81 and 82 are held in their adjusted positions by both the frictional engagement of the thumb nuts 86 and the engagement of the adjusting screw 88 with the top face of the base plate 11.

It is preferably at this time that adjustment is made of the saw tooth advancing ratchet mechanism, particularly illustrated in FIGS. 3 and 4. It will first be determined from the configuration of the saw 25 and of the successive teeth 26 thereon, whether the cuts are to be made upon immediately adjacent teeth or on some other tooth spacing. With this determined, the adjustment screw 54 is located by loosening its collar 56 and rotating the screw so that the upward or clockwise movement of the arm 49 will move the ratchet arm 51 the desired number of teeth. Thereafter, the position of the adjusting screw 55 is set to determine the maximum downward or counterclockwise rotation of the arm 49 to index the teeth 26 with the cutting file in proper position to remove the desired amount of material from the edge of the saw tooth in the sharpening operation. With the above settings made, the adjustment screws 54 and 55 are locked in position by tightening of their collars 56 and 57.

With the adjustment settings completed, the sharpening operation may be carried out. The motor 136 is energized to effect rotation of the crank 134 and reciprocation of the carriage 105 so that the cutting file 112 is moved forwardly and rearwardly with respect to the base plate 11. The saw carriage 20 is preferably moved toward the left, as viewed in FIG. 1, to place the end tooth adjacent to the clamp 28 in indexed position for the sharpening cut to be given by the cutting file 112. During this movement of the saw carriage 20 the tool supporting carriage 105 is placed in its upward, dotted line position, as shown in FIGURE 1. Thereafter, the carriage 105 is moved downwardly into the full line position of FIGURE 1 and the cutting file 112 makes its cutting movement across the indexed saw tooth. With the sharpening cut completed, the carriage 105 is again moved upwardly through manual operation of the handle 114, into the dotted line position. The arm 49 is now moved, first upwardly into the dotted line position of FIG. 3, and then downwardly into the full line position, to advance the carriage 20 and saw 25 toward the right, as viewed in FIG. 1, to index the next succeeding tooth to be sharpened with the cutting file 112. The carriage 105 is again lowered into the full line position, of FIG. 1 and another sharpening cut is made on the now indexed tooth. These operations of raising the carriage 105, raising and lowering the arm 49, and again lowering the carriage 105 are carried out in succession and in synchronization to sharpen the successive teeth on the saw 25 until the end tooth adjacent to clamp 27 has been sharpened.

Depending on the type of saw being sharpened, this may complete the sharpening operation, in which case the saw may be removed from the apparatus by loosening the means clamping it on the apparatus 20. On the other hand, depending upon the type of teeth on the particular saw being sharpened, certain teeth may require a sharpening cut at another angular relation. In this case the carriage 61 may be adjusted to a different angular position on the base plate 11, the supporting plates 81 and 82 adjusted to give the desired depth of cut for the sharpening operation being considered, and the adjustment screws 54 and 55 reset to properly index the teeth to be sharpened with the cutting file 112. Thereafter, the carriage 105 and the ratchet advancement arm 49 are operated in sequence, as previously described, to effect this cutting operation.

It will thus be seen that after a few simple pre-set adjustments have been made on the apparatus, the sharpening cuts on the teeth of the saw may be carried out very quickly, and with absolute uniformity with respect to the different teeth on the saw, thus insuring that the saw cut will be uniform throughout the length or circumference of the saw blade.

While a certain presently preferred embodiment of the invention has been selected for specific illustration in the drawings and for description herein, it will be understood that the invention is not limited thereto, as many variations will be readily apparent to those skilled in the art and the invention is to be given its broadest interpretation within the terms of the following claims.

I claim:

1. A saw sharpening device comprising: a first support mounted for rotation about a substantially vertical axis to determine the angle of the sharpening cut; a second support mounted on said first support for rectilinear movement relative thereto to determine the depth of the sharpening cut; a third support mounted on said second support for rotation relative thereto about a substantially horizontal axis; stop means on said second support limiting the downward rotational movement of said third support; saw tooth cutting means mounted on said third support for movement therewith into and out of cutting position with relation to the saw teeth to be sharpened; and means for effecting cutting movement of said saw tooth cutting means.

2. A saw sharpening device comprising: saw mounting means; a first support mounted for rotation in a substantially horizontal plane to determine the angle of the sharpening cut; a second support mounted on said first support and adjustable relative thereto to determine the depth of the sharpening cut; a third support pivotally mounted upon said second support for rotation relative thereto about a substantially horizontal axis; stop means on said second support limiting the downward rotational movement of said third support, saw tooth cutting means mounted on said third support for movement therewith into and out of cutting relation with the saw teeth to be sharpened; means for effecting cutting movement of said saw tooth cutting means; and means for advancing said saw mounting means in predetermined successive incremental distances to index successive teeth with said cutting means.

3. A saw sharpening device comprising: saw mounting means; a first support mounted for rotation about a substantially vertical axis to determine the angle of the sharpening cut; a second support mounted on said first support for rectilinear movement thereto to determine the depth of the sharpening cut; a third support mounted on said second support for rotation relative thereto about a substantially horizontal axis; stop means on said second support limiting the downward rotational movement of said third support, saw tooth cutting means mounted on said third support for movement therewith into and out of cutting position with relation to the saw teeth to be sharpened; means for effecting cutting movement of said saw tooth cutting means; and means for advancing said saw mounting means in predetermined successive incremental distances to index successive teeth with said cutting means.

4. A saw tooth filing device comprising: a first support; a second support mounted on said first support and adjustable relative thereto; a pivot carried by said second support; a third support mounted on said pivot for rotational movement in a substantially vertical plane; a stop on said second support limiting rotational movement of said third support relative to said first and second supports; a reciprocable carriage carried by said third support; means on said carriage for supporting filing means; and means for reciprocating said carriage.

5. A saw tooth filing device as defined in claim 4 in which said first support is mounted for rotation in a substantially horizontal plane to establish the angle at which the filing means engages the saw teeth.

6. A saw tooth filing device comprising: a base plate; means for mounting a saw for movement relative to said base plate to index successive teeth in sharpening position; a U-shaped support mounted on said base plate for rotation about a vertical axis to establish an angular relationship with said saw mounting means; a pair of vertically adjustable plates mounted on the outside faces of the legs of said U-shaped support; a second U-shaped support pivotally mounted upon said adjustable plates and disposed within said first U-shaped support, said second U-shaped support rotating about a substantially horizontal axis; cooperating means on said second U-shaped support and on said adjustable plates for limiting the extreme downward swinging movement of said second U-shaped support; a reciprocable carriage carried by said second U-shaped support; a cutting file mounted on said carriage and adapted to be presented to the teeth to be sharpened on said saw as said teeth are successively indexed with respect to said base plate; and means for reciprocating said carriage to effect a filing cut upon the saw teeth.

7. A saw tooth filing device comprising: a base plate; means for mounting a saw for movement relative to said base plate to index successive teeth in sharpening position; a U-shaped support mounted on said base plate for rotation about a vertical axis to establish an angular relationship with said saw mounting means; a pair of vertically adjustable plates mounted on the outside faces of the legs of said U-shaped support; a second U-shaped support pivotally mounted upon said adjustable plates and disposed within said first U-shaped support, said second U-shaped support rotating about a substantially horizontal axis; cooperating means on said second U-shaped support and on said adjustable plates for limiting the extreme downward swinging movement of said second U-shaped support; a reciprocable carriage carried by said second U-shaped support; a cutting file mounted on said carriage and adapted to be presented to the teeth to be sharpened on said saw as said teeth are successively indexed with respect to said base plate; and means for reciprocating said carriage to effect a filing cut upon the saw teeth, said last mentioned means being mounted upon and movable with said second U-shaped support.

8. A saw tooth filing device comprising: a base plate; means for mounting a saw for movement relative to said base plate to index successive teeth in sharpening position; a U-shaped support mounted on said base plate for rotation about a vertical axis to establish an angular relationship with said saw mounting means; a pair of vertically adjustable plates mounted on the outside faces of the legs of said U-shaped support; a second U-shaped support pivotally mounted upon said adjustable plates and disposed within said first U-shaped support, said second U-shaped support rotating about a substantially horizontal axis; cooperating means on said second U-shaped support and on said adjustable plates for limiting the extreme downward swinging movement of said second U-shaped support; a reciprocable carriage carried by said second U-shaped support; a cutting file mounted on said carriage and adapted to be presented to the teeth to be sharpened on said saw as said teeth are successively indexed with respect to said base plate; means for reciprocating said carriage to effect a filing cut upon the saw teeth, said last mentioned means being mounted upon and movable with said second U-shaped support; and means carried by said base plate for effecting successive predetermined incremental movements of said saw relative to the base plate to properly index successive teeth with said cutting file.

References Cited in the file of this patent
UNITED STATES PATENTS

| | | |
|---|---|---|
| 101,938 | Strong | Apr. 12, 1870 |
| 1,224,293 | Foley | May 1, 1917 |
| 1,425,602 | Meed | Aug. 15, 1922 |
| 1,678,279 | Branch | July 24, 1928 |
| 1,852,276 | Waller | Apr. 5, 1932 |
| 1,974,882 | St. Martin | Sept. 25, 1934 |
| 2,811,874 | Rethoret | Nov. 5, 1957 |
| 2,842,983 | Renie | July 15, 1958 |